(12) United States Patent
Sung et al.

(10) Patent No.: US 9,587,056 B2
(45) Date of Patent: Mar. 7, 2017

(54) OLEFIN BASED POLYMER HAVING EXCELLENT PROCESSABILITY

(71) Applicant: LG CHEM, LTD., Seoul (KR)

(72) Inventors: Yu Taek Sung, Daejeon (KR); Ki Soo Lee, Daejeon (KR); Heon Yong Kwon, Daejeon (KR); Dae Sik Hong, Daejeon (KR); Se Young Kim, Daejeon (KR); Sung Min Lee, Daejeon (KR); Dong Hoon Jeong, Daejeon (KR); Eun Young Shin, Daejeon (KR); Hyun Jee Kwon, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 15/111,394

(22) PCT Filed: Dec. 15, 2015

(86) PCT No.: PCT/KR2015/013735
§ 371 (c)(1),
(2) Date: Jul. 13, 2016

(87) PCT Pub. No.: WO2016/099118
PCT Pub. Date: Jun. 23, 2016

(65) Prior Publication Data
US 2016/0333124 A1   Nov. 17, 2016

(30) Foreign Application Priority Data

Dec. 15, 2014   (KR) .................. 10-2014-0180750
Dec. 2, 2015    (KR) .................. 10-2015-0170825

(51) Int. Cl.
C08F 210/02   (2006.01)
C08F 210/16   (2006.01)
C08L 23/08    (2006.01)

(52) U.S. Cl.
CPC ............ *C08F 210/16* (2013.01); *C08L 23/08* (2013.01); *C08F 2500/01* (2013.01); *C08F 2500/04* (2013.01); *C08F 2500/12* (2013.01); *C08L 2203/16* (2013.01)

(58) Field of Classification Search
CPC .................................................. C08F 210/16
See application file for complete search history.

(56) References Cited

U.S. PATENT DOCUMENTS

| | | | |
|---|---|---|---|
| 4,935,474 A | 6/1990 | Ewen et al. | |
| 5,218,071 A * | 6/1993 | Tsutsui .................. | C08F 10/06 526/160 |
| 5,272,236 A | 12/1993 | Lai et al. | |

(Continued)

FOREIGN PATENT DOCUMENTS

| | | | | |
|---|---|---|---|---|
| EP | 3031831 A1 | 6/2016 | | |
| JP | 2005-53997 A * | 3/2005 | .............. | C08L 23/04 |

(Continued)

*Primary Examiner* — Rip A Lee
(74) *Attorney, Agent, or Firm* — Dentons US LLP (57) ABSTRACT

The present invention relates to an ethylene-alpha olefin copolymer having excellent processability. The copolymer according to the present invention has a high molecular weight and a broad molecular weight distribution and exhibits an excellent processability and an improved mechanical physical property, and thus can be effectively used for the application in need thereof.

8 Claims, 5 Drawing Sheets

(56) References Cited

U.S. PATENT DOCUMENTS

| | | | |
|---|---|---|---|
| 5,914,289 A | 6/1999 | Razavi | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 6,914,112 B2 * | 7/2005 | Mori | C08L 23/04 526/281 |
| 7,557,172 B2 | 7/2009 | Kawashima et al. | |
| 7,592,403 B2 * | 9/2009 | Kashiwa | C08F 210/16 526/131 |
| 8,101,685 B2 * | 1/2012 | Jiang | C08L 23/06 525/191 |
| 8,921,500 B2 | 12/2014 | Karjala et al. | |
| 9,079,991 B2 * | 7/2015 | Ker | C08F 210/16 |
| 2003/0232716 A1 * | 12/2003 | McDaniel | C08F 10/00 502/115 |
| 2008/0004411 A1 * | 1/2008 | Sukhadia | C08J 5/18 526/348.1 |
| 2010/0152361 A1 * | 6/2010 | Weaver | C08F 297/08 524/528 |
| 2012/0095158 A1 * | 4/2012 | Patel | B32B 27/32 524/579 |
| 2013/0029125 A1 * | 1/2013 | Tse | C08L 23/04 428/220 |
| 2013/0144019 A1 * | 6/2013 | Demirors | C08F 10/00 526/165 |

FOREIGN PATENT DOCUMENTS

| | | |
|---|---|---|
| JP | 2006-307176 A | 11/2006 |
| JP | 2010-229214 A | 10/2010 |
| JP | 2013-538915 A | 10/2013 |
| KR | 10-2004-0076965 A | 9/2004 |
| KR | 10-2010-0067627 A | 6/2010 |
| KR | 10-1213732 B1 | 12/2012 |
| WO | 94/07930 A1 | 4/1994 |

* cited by examiner

OLEFIN BASED POLYMER HAVING EXCELLENT PROCESSABILITY

CROSS-REFERENCE TO RELATED APPLICATION(S)

This application is a 35 USC §371 National Stage entry of International Application No. PCT/KR2015/013735 filed on Dec. 15, 2015, and claims the benefit of Korean Application No. 10-2014-0180750 filed on Dec. 15, 2014, and Korean Application No. 10-2015-0170825 filed on Dec. 2, 2015, all of which are incorporated by reference in their entirety for all purposes as if fully set forth herein.

TECHNICAL FIELD

The present invention relates to an olefin based polymer having excellent processability.

BACKGROUND OF ART

Olefin polymerization catalyst systems can be classified into Ziegler-Natta and metallocene catalyst systems, and these highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that molecular weight distribution is broad. Also, since a compositional distribution of comonomers is not uniform, there is a problem that it has a limitation to secure the desired physical properties.

Meanwhile, the metallocence catalyst includes a main catalyst whose main component is a transition metal compound, and an organometallic compound cocatalyst whose main component is aluminium. Such a catalyst is a single-site catalyst which is a homogeneous complex catalyst, and offers a polymer having a narrow molecular weight distribution and an uniform composition distribution of comonomers, depending on the single site characteristics. The stereoregularity, copolymerizing properties, molecular weight, crystallinity and the like of the resulting polymer can be controlled by changing the ligand structure of the catalyst and the polymerization condition.

U.S. Pat. No. 5,914,289 discloses a method of controlling the molecular weight and the molecular weight distribution of polymers using metallocene catalysts which are respectively supported on supports. However, a large amount of solvent and a long period of time are required to prepare the supported catalysts, and the process of supporting metallocene catalysts on the respective support is troublesome.

Korean Patent Application No. 10-2003-0012308 discloses a method of controlling the molecular weight distribution of polymers by changing and polymerizing a combination of catalysts in a reactor by supporting a bi-nuclear metallocene catalyst and a mononuclear metallocene catalyst on a support with an activator. However, this method has a limitation to achieve the properties of the respective catalysts simultaneously. In addition, there is a disadvantage that a metallocene catalyst portion is departed from a supported component of the catalyst to cause fouling in the reactor.

Therefore, in order to solve the above-mentioned disadvantages, there is a need to develop a method for preparing olefin based polymers with the desired physical properties by easily preparing a supported metallocene catalyst having an excellent activity.

On the other hand, a linear low density polyethylene is prepared by copolymerizing ethylene and alpha-olefins using a polymerization catalyst under a low pressure. Thus, this is a resin having a narrow molecular weight distribution which has a certain length of a short chain branch, without a long chain branch. The linear low density polyethylene film has, in addition to the characteristics of a typical polyethylene, high strength and elongation at break, and exhibits excellent tear strength and falling weight impact strength. The use of the linear low density polyethylene film increases in the stretch film, overlapping film or the like which is difficult to apply to existing low density polyethylene or high density polyethylene.

However, the linear low density polyethylene using 1-butene or 1-hexene as a comonomer is mostly prepared in a single gas phase reactor or a single loop slurry reactor, and the productivity is high as compared to a process using 1-octene comonomer, but these products also have limits in the catalyst technology and process technology. Thus, they are problematic in that their physical properties are greatly inferior to when using 1-octene comonomer and the molecular weight distribution is narrow and thus the processability is poor.

Many studies are conducted to improve these problems, and U.S. Pat. No. 4,935,474 discloses a process for producing polyethylenes having a broad molecular weight distribution by using two or more metallocene compounds. U.S. Pat. No. 6,828,394 discloses a process for producing polyethylenes having an excellent processability and particularly suitable for the film. In addition, U.S. Pat. No. 6,841,631 and U.S. Pat. No. 6,894,128 disclose that polyethylenes having a bimodal or multimodal molecular weight distribution is prepared by a metallocene catalyst comprising at least two metal compounds and thus it can be used for a film, a blow molding, a pipe and the like. However, there are still problems that although the processability of these products was improved, the dispersion state per molecular weight within the unit particle is not uniform and thus the extruded appearance is rough even under a relatively good extrusion condition, and the physical property is not stable.

Given the above circumstances, the preparation of superior products, having a balance between the physical property and the processability is continuously required, and further improvement for this is necessary.

DETAILED DESCRIPTION OF THE INVENTION

Technical Problem

In order to solve the above-mentioned problems, an object of the present invention is to provide an ethylene-alpha olefin copolymer having an excellent processability and an improved mechanical physical property.

Technical Solution

In order to achieve the above object, the present invention provides an ethylene-alpha olefin copolymer which satisfies the following conditions:
the ethylene-alpha olefin copolymer has
a weight average molecular weight of 50,000 to 150,000,
a molecular weight distribution (Mw/Mn) of 2 to 5, a density of 0.910 to 0.940 g/cm$^3$, MFRR ($MI_{10}/MI_{2.16}$) of 10 to 20, and a $C_2$ value of −0.30 to −0.60 when a graph of complex viscosity ($\eta^*$[Pa·s]) at the frequency ($\omega$ [rad/s]) of 0.05 to 500 rad/s is fitted to the following Equation 1:

$$y=c_1 x^{c_2} \quad \text{[Equation 1]}$$

a plateau delta value in Van Gurp Palmen plot satisfies the following Equation 2:

$$-0.02 \times (Mw/10^4)+0.76 \leq \text{plateau delta} \leq -0.02 \times (Mw/10^4)+1.36 \quad \text{[Equation 2]}$$

The above-defined ethylene-alpha olefin copolymer has an introduced long chain branch (LCB) in order to increase the processibility of polyethylene, and exhibits excellent processability and haze characteristics.

In addition, the catalyst that can be used to satisfy each of the above conditions will be described later.

The weight average molecular weight (g/mol) of the ethylene-alpha olefin copolymer is 50,000 to 150,000, preferably 90,000 to 125,000.

The molecular weight distribution (Mw/Mn) of the ethylene-alpha olefin copolymer is 2 to 5, preferably 2.5 to 3.5.

The density (g/cm$^3$) of the ethylene-alpha olefin copolymer is 0.910 to 0.940, preferably 0.915 to 0.930.

MFRR ($MI_{10}/MI_{2.16}$) of the ethylene-alpha olefin copolymer is 10 to 20, and measured at 190° C. in accordance with ASTM 1238.

Also, the ethylene-alpha olefin copolymer of the present invention has a $C_2$ value of −0.30 to −0.60 when a graph of complex viscosity ($\eta^*$[Pa·s]) at the frequency ($\omega$ [rad/s]) of 0.05 to 500 rad/s is fitted to the Equation 1

Equation 1 is a power law model, wherein x means a frequency, y means a complex viscosity, and two variables $C_1$ and $C_2$ are required. $C_1$ refers to a consistency index, $C_2$ refers to a CV index, and $C_2$ value means a gradient of graph.

The graph of complex viscosity versus frequency is associated with a fluidity, and this means that having a high complex viscosity at a low frequency and having a low complex viscosity at a high frequency give rise to having higher fluidity. In other words, having the value of negative gradient and increasing the absolute value of the gradient can exhibit a higher fluidity. The ethylene-alpha olefin copolymer of the present invention has a gradient ($C_2$) of about −0.30 to about −0.60 in the graph of complex viscosity versus frequency and exhibits significantly higher fluidity as compared with a conventional olefin based polymer having similar density and weight average molecular weight. Thus, it can be seen that despite a low melt index, the shear thinning effect is far superior, thus exhibiting excellent fluidity and processability. Preferably, the $C_2$ is −0.30 to −0.55. Further, the $C_1$ is 30,000 to 300,000.

The complex viscosity at different frequencies can be calculated with a dynamic frequency sweep at 190° C. using ARES (advanced rheometric expansion system). The dynamic frequency sweep can be measured by using 25 mm parallel plate in the form of disc.

Further, the ethylene-alpha olefin copolymer of the present invention is characterized in that in Van Gurp Palmen plot, the plateau delta value satisfies the following Equation 2:

$$-0.02 \times (Mw/10^4)+0.76 \leq \text{plateau delta} \leq -0.02 \times (Mw/10^4)+1.36 \quad \text{[Equation 2]}$$

Van Gurp-Palmen plot is a graph where X-axis is a complex modulus G (dyne/cm$^2$) and Y-axis is a phase angle d (delta) and used in determining the presence of LCB in the olefin polymer. In particular, if an inflection point is present in the graph, it means the presence of LCB. These polymers are excellent in swell, bubble stability, melt fracture, sagging time and the like, and can be applied variously depending on the application. In particular, it is possible to provide a pipe having particularly improved physical properties, and the like. In particular, the present invention is characterized in that the plateau delta value which is d-value at the inflection point satisfies the above Equation 2. Preferably, the plateau delta value satisfies the following Equation 2-1. Van Gurp-Palmen graph can be obtained by selecting and plotting $G^*$ and delta of the variables resulted from the dynamic frequency sweep test. $G^*$ is a force applied during modification of the polymer, and delta corresponds to an elastic modulus of them.

$$-0.02 \times (Mw/10^4)+0.91 \leq \text{plateau delta} \leq -0.02 \times (Mw/10^4)+1.26 \quad \text{[Equation 2-1]}$$

The olefin based polymer as described above can be prepared by using a supported metallocene catalyst, and specifically uses a supported catalyst including one or more selected from the group consisting of a first catalyst represented by the following Chemical Formula 1, a second catalyst represented by the following Chemical Formula 2 and a third catalyst represented by the following Chemical Formula 3.

[Chemical Formula 1]

in the Chemical Formula 1,

M is a Group 4 transition metal;

B is carbon, silicon or germanium;

$Q_1$ and $Q_2$ are each independently hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl or $C_{5-20}$ heteroaryl; with the proviso that at least one of $Q_1$ and $Q_2$ is $C_{2-20}$ alkoxyalkyl;

$X_1$ and $X_2$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$C_1$ is the following Chemical Formula 2a, $C_2$ is the following Chemical Formula 2a or the following Chemical Formula 2b:

[Chemical Formula 2a]

[Chemical Formula 2b]

in the Chemical Formulas 2a and 2b, $R_1$ to $R_{13}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl, $R'_1$ to $R'_3$ are each independently hydrogen, halogen, $C_{1-20}$ alkyl, $C_{2-20}$ alkenyl, or $C_{6-20}$ aryl,

[Chemical Formula 2]

in the Chemical Formula 2, $R_{10}$ to $R_{13}$ and $R'_{10}$ to $R'_{13}$ are each independently hydrogen, $C_{1-20}$ alkyl, $C_{2-20}$ alkenyl, $C_{6-20}$ aryl, $C_{7-20}$ alkylaryl, $C_{7-20}$ arylalkyl, $C_{2-20}$ alkoxyalkyl or $C_{1-20}$ amine, or adjacent two or more of $R_{10}$ to $R_{13}$ and $R'_{10}$ to $R'_{13}$ are connected to each other to form one or more aliphatic, aromatic, or heterocyclic rings, wherein the aliphatic, aromatic, or heterocyclic rings are unsubstituted or substituted with $C_{1-20}$ alkyl;

Q is $-CH_2CH_2-$, $-C(Z_1)(Z_2)-$ or $-Si(Z_1)(Z_2)-$;

$Z_1$ and $Z_2$ are each independently hydrogen, $C_{1-20}$ alkyl, $C_{3-20}$ cycloalkyl, $C_{1-20}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, or $C_{7-40}$ arylalkyl;

$M_2$ is a Group 4 transition metal;

$X_3$ and $X_4$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

[Chemical Formula 3]

in the Chemical Formula 3, $M_3$ is a Group 4 transition metal;

$X_5$ and $X_6$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$R_{14}$ to $R_{19}$ are each independently hydrogen, $C_{1-20}$ alkyl, $C_{2-20}$ alkenyl, $C_{1-20}$ alkoxy, $C_{6-20}$ aryl, $C_{7-20}$ alkylaryl, $C_{7-20}$ arylalkyl, $C_{1-20}$ alkylsilyl, $C_{6-20}$ arylsilyl, or $C_{1-20}$ amine; or adjacent two or more of $R_{14}$ to $R_{17}$ are connected to each other to form one or more aliphatic, aromatic, or heterocyclic rings;

$L_2$ is $C_{1-10}$ linear or branched alkylene;

$D_2$ is $-O-$, $-S-$, $-N(R)-$ or $-Si(R)(R')-$, wherein R and R' are each independently hydrogen, halogen, $C_{1-20}$ alkyl, $C_{2-20}$ alkenyl, or $C_{6-20}$ aryl;

$A_2$ is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{2-20}$ heterocycloalkyl, or $C_{5-20}$ heteroaryl;

B is carbon, silicon, or germanium, which is a bridge which binds to cyclopentadienyl-based ligand and $J(R_{19})_{z-y}$ by a covalent bond;

J is a Group 15 element or a Group 16 atom of the Periodic Table;

z is the oxidation number of the element J; and y is the number of bond of the element J.

In the present invention, when using two kinds of catalysts, it is preferable to use i) a first catalyst and ii) a second catalyst or a third catalyst, and it is more preferable to use a first catalyst and a second catalyst.

The first catalyst represented by Chemical Formula 1 is characterized in that a silyl group is substituted particularly with $C_1$ (Chemical Formula 2a). Also, indene derivatives of $C_1$ (Chemical Formula 2a) have a relatively low electron density compared to indenoindole derivatives or fluorenyl derivatives and includes a silyl group with a large steric hindrance. Therefore, due to steric hindrance effects and electron density factors, the olefin polymer with a relatively low molecular weight can be polymerized with high activity as compared with the metallocene compound having a similar structure.

Moreover, the fluorenyl derivatives which can be represented as in $C_2$ (Chemical Formula 2b) form a structure which is crosslinked by a bridge and have an unshared electron pair which can act as a Lewis base to the structure of the ligand, thereby exhibiting a high polymerization activity.

Preferably, in the Chemical Formula 1, M is zirconium, B is silicon, $Q_1$ and $Q_2$ are each independently a $C_{1-20}$ alkyl or $C_{2-20}$ alkoxyalkyl, with the proviso that at least one of $Q_1$ and $Q_2$ is $C_{2-20}$ alkoxyalkyl (preferably, $C_{1-6}$ alkyl substituted with butoxy), and $X_1$ and $X_2$ are halogen. More preferably, $Q_1$ is methyl, and $Q_2$ is 6-tert-butoxy-hexyl.

Further, preferably, in the Chemical Formulas 2a and 2b, $R_1$ to $R_{13}$ are hydrogen and $R'_1$ to $R'_3$ are $C_{1-20}$ alkyl. More preferably, $R'_1$ to $R'_3$ are methyl.

Representative examples of the compounds represented by Chemical Formula 1 are the same as the compounds represented by the following Chemical Formula 1-1 or 1-2:

[Chemical Formula 1-1]

[Chemical Formula 1-2]

The method for preparing the first catalyst will be specifically described by way of the examples below.

In the supported catalyst, the first catalyst represented by Chemical Formula 1 may mainly contribute to make a copolymer having a high molecular weight and the catalyst represented by Chemical Formula 2 or Chemical Formula 3 may contribute to make a copolymer having a relatively low molecular weight.

Preferably, in Chemical Formula 2, $R_{10}$ to $R_{13}$ and $R'_{10}$ to $R'_{13}$ are each independently hydrogen, $C_{1-20}$ alkyl or $C_{2-20}$ alkoxyalkyl, or adjacent two or more of $R_{10}$ to $R_{13}$ and $R'_{10}$ to $R'_{13}$ are connected to each other to form one or more aliphatic or aromatic rings, wherein the aliphatic or aromatic rings are unsubstituted or substituted with $C_{1-20}$ alkyl;

Q is —$CH_2CH_2$—, —$C(Z_1)(Z_2)$— or —$Si(Z_1)(Z_2)$—;

$Z_1$ and $Z_2$ are each independently $C_{1-20}$ alkyl or $C_{2-20}$ alkoxyalkyl;

$M_2$ is zirconium; and $X_3$ and $X_4$ are halogen.

More preferably, in Chemical Formula 2, $R_{10}$ to $R_{13}$ and $R'_{10}$ to $R'_{13}$ are each independently hydrogen, methyl or 6-tert-butoxy-cyclohexyl, or adjacent two or more of $R_{10}$ to $R_{13}$ and $R'_{10}$ to $R'_{13}$ are connected to each other to form at least one benzene ring or cyclohexane ring, wherein the benzene ring is unsubstituted or substituted with tert-butoxy;

Q is —$CH_2CH_2$—, —$C(Z_1)(Z_2)$— or —$Si(Z_1)(Z_2)$—;

$Z_1$ and $Z_2$ are each independently methyl or 6-tert-butoxy-hexyl;

$M_2$ is zirconium; and $X_3$ and $X_4$ is chloro.

Representative examples of the compounds represented by Chemical Formula 2 are as follows:

, and

The method for preparing the second catalyst will be specifically described by way of the examples below.

The third catalyst represented by Chemical Formula 3 may contribute to make a copolymer having approximately middle molecular weight of the first catalyst and the second catalyst.

Preferably, in Chemical Formula 3,
$M_3$ is titanium;
$X_5$ and $X_6$ are halogen;
$R_{14}$ to $R_{19}$ are $C_{1-20}$ alkyl;
$L_2$ is $C_{1-10}$ linear or branched alkylene;
$D_2$ is —O—;
$A_2$ is $C_{1-20}$ alkyl;
B is silicone;
J is nitrogen;
z is the oxidation number of the element J; and
y is the number of bond of the element J.

Representative examples of the compounds represented by Chemical Formula 3 are as follows:

The method for preparing the third catalyst will be specifically described by way of the examples below.

In the supported catalyst according to the present invention, a support containing hydroxyl groups on the surface may be used as the support, and preferably a support having a hydroxy group and a siloxane group with high reactivity in which the surface is dried and removed of moisture can be used.

For example, silica, silica-alumina, silica-magnesia or the like that are dried at high temperature can be used, and these may typically contain oxides, carbonates, sulfates and nitrates, such as $Na_2O$, $K_2CO_3$, $BaSO_4$, and $Mg(NO_3)_2$ or the like.

In the supported catalyst according to the present invention, the weight ratio of the catalyst to the support is preferably in the range of 1:1 to 1:1000. When containing the catalyst and the carrier in the range of the above weight ratio, it may exhibit a proper activity of the supported catalyst and thus it may be advantageous in terms of the activity maintenance and economy of the catalyst.

Further, the weight ratio of i) the first catalyst represented by Chemical Formula 1 and ii) one or more catalysts selected from the group consisting of the second catalyst represented by Chemical Formula 2 and the third catalyst represented by Chemical Formula 3 is preferably in the range of 1:100 to 100:1. The optimum catalytic activity is shown in the range of the above weight ratio and thus it may be advantageous in terms of the activity maintenance and economy of the catalyst.

In addition to the above catalyst, a co-catalyst can be further used to produce an olefin polymer. As the co-catalyst, one or more of the co-catalyst compounds represented by the following Chemical Formula 4, Chemical Formula 5 or Chemical Formula 6 can be further included.

$$—[Al(R_{30})—O]_m—$$ [Chemical Formula 4]

in the Chemical Formula 4,
$R_{30}$ may be same as or different from each other, and are each independently halogen; hydrocarbon having 1 to 20 carbon atoms; or halogen-substituted hydrocarbons having 1 to 20 carbon atoms;
m is an integer of 2 or more, $$J(R_{31})_3$$ [Chemical Formula 5]

in the Chemical Formula 5,
$R_{31}$ is as defined in Chemical Formula 4;
J is aluminum or boron;

$$[E-H]^+[ZA_4]^- \text{ or } [E]^+[ZA_4]^-$$ [Chemical Formula 6]

in the Chemical Formula 6,
E is neutral or cationic Lewis base;
H is hydrogen atom;
Z is a Group 13 element; and
A may be same as or different from each other, and is each independently an aryl group having 6 to 20 carbon atoms or an alkyl group having 1 to 20 carbon atoms, in which one or more hydrogen atoms are substituted or unsubstituted with halogen, hydrocarbon having 1 to 20 carbon atoms, alkoxy or phenoxy.

Examples of the compounds represented by Chemical Formula 4 include methyl aluminoxane, ethyl aluminoxane, isobutyl aluminoxane, butyl aluminoxane and the like, and a more preferred compound is methylaluminoxane.

Examples of the compounds represented by Chemical Formula 5 include trimethylaluminum, triethylaluminum, triisobutyl aluminum, tripropyl aluminum, tributyl aluminum, dimethylchloro aluminum, triisopropyl aluminum, tri-s-butyl aluminum, tricyclopentyl aluminum, tripentyl aluminum, triisopentyl aluminum, trihexyl aluminum, trioctyl aluminum, ethyldimethyl aluminum, methyl diethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron and the like, and a more preferred compound is selected among trimethylaluminum, triethylaluminum and triisobutylaluminum.

Examples of the compounds represented by Chemical Formula 6 include triethylammonium tetraphenyl boron, tributylammonium tetraphenyl boron, trimethylammonium tetraphenyl boron, tripropylammonium tetraphenyl boron, trimethyl ammonium tetra(p-tolyl)boron, trimethyl ammonium tetra(o,p-dimethylphenyl)boron, tributylammonium tetra(p-trifluoromethylphenyl)boron, trimethyl ammonium tetra(p-trifluoromethylphenyl)boron, tributylammonium tetrapentafluorophenyl boron, N,N-diethylanilinium tetraphenyl boron, N,N-diethylanilinium tetrapentafluorophenyl boron, diethylamonium tetrapentafluorophenyl boron, triphenylphosphonium tetraphenyl boron, trimethyl phosphonium tetraphenyl boron, triethylammonium tetraphenyl aluminum, tributylammonium tetraphenylaluminum, trimethylammonium tetraphenyl aluminum, tripropyl ammonium tetraphenyl aluminum, trimethyl ammonium tetra(p-tolyl)aluminum, tripropyl ammonium tetra(p-tolyl) aluminum, triethylammonium tetra(o,p-dimethylphenyl) aluminum, tributylammonium tetra(p-trifluoromethyl phenyl)aluminum, trimethylammonium tetra(p-trifluoromethylphenyl)aluminum, tributylammonium tetrapentafluorophenylaluminum, N,N-diethylanilinium tetraphenyl aluminum, N,N-diethylanilinium tetrapentafluoro phenylaluminum, diethylammonium tetrapenta tetraphenylaluminum, triphenylphosphonium tetraphenylaluminum, trimethyl phosphonium tetraphenyl aluminum, tripropylammoniumtetra(p-tolyl)boron, triethylammonium tetra(o,p-dimethylphenyl)boron, tributylammonium tetra(p-trifluoromethylphenyl)boron, triphenyl carbonium tetra(p-trifluoromethylphenyl)boron, tetraphenylcarbonium tetrapentafluorophenyl boron and the like.

The supported catalyst according to the present invention can be prepared by the steps of supporting a co-catalyst compound on a support, supporting a first catalyst on the support, and supporting a second catalyst and/or a third catalyst on the support, wherein the order of supporting the catalysts may be varied as required.

As a reaction solvent in the production of the supported catalyst, hydrocarbon based solvents such as pentane, hexane or heptane and aromatic solvents such as benzene or toluene can be used. Further, the metallocene compound and the co-catalyst compound can be used in the form supported on silica or alumina.

In addition, the present invention provides a method for preparing an olefin based polymer comprising the step of polymerizing olefin-based monomers in the presence of the above supported catalyst.

In the method for preparing an olefin based polymer according to the present invention, specific examples of the olefin based monomers include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene or the like, and two or more of these monomers may be mixed to be copolymerized.

The olefin based polymer is more preferably ehtylene/alpha olefinic copolymer, but is not limited thereto.

When the olefin based polymer is ehtylene/alpha olefinic copolymer, the content of the alpha olefin which is the comonomer is not particularly limited, and it can be properly selected depending on the use, object or the like of olefin based polymers. More particularly, the content of the alpha olefin polymer may be greater than 0 mol % and not greater than 99 mol %.

The polymerization reaction may be carried out by homopolymerizing one olefin based monomer or by copolymerizing two or more monomers, using a continuous slurry polymerization reactor, a loop slurry reactor, a gas phase reactor or a solution reactor.

The supported catalyst can be injected by dissolving or diluting in $C_5$ to $C_{12}$ aliphatic hydrocarbon solvent, such as pentane, hexane, heptane, nonane, decane and isomers thereof, an aromatic hydrocarbon solvent such as toluene and benzene, or a hydrocarbon solvent substituted by a chlorine atom, such as dichloromethane and chlorobenzene. The solvent used herein is preferably treated with a small amount of alkyl aluminum to remove a small amount of water or air and the like which act as a catalyst poison. This treatment can be performed by further using a co-catalyst.

Advantageous Effects

As described above, the ethylene-alpha olefin copolymer according to the present invention has high molecular weight broad molecular weight distribution and exhibits excellent processability and mechanical physical properties, and thus can be effectively used for the application of films or the like.

DETAILED DESCRIPTION OF THE EMBODIMENTS

Figure 1:
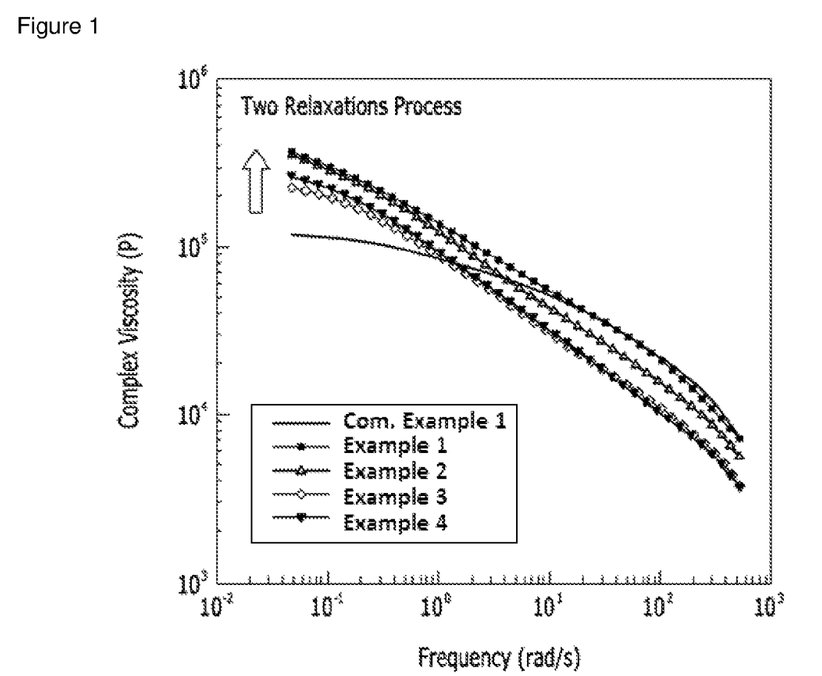
FIG. 1 shows a graph of the complex viscosity versus frequency in accordance with a comparative example and an example of the present invention.
Figure 2:
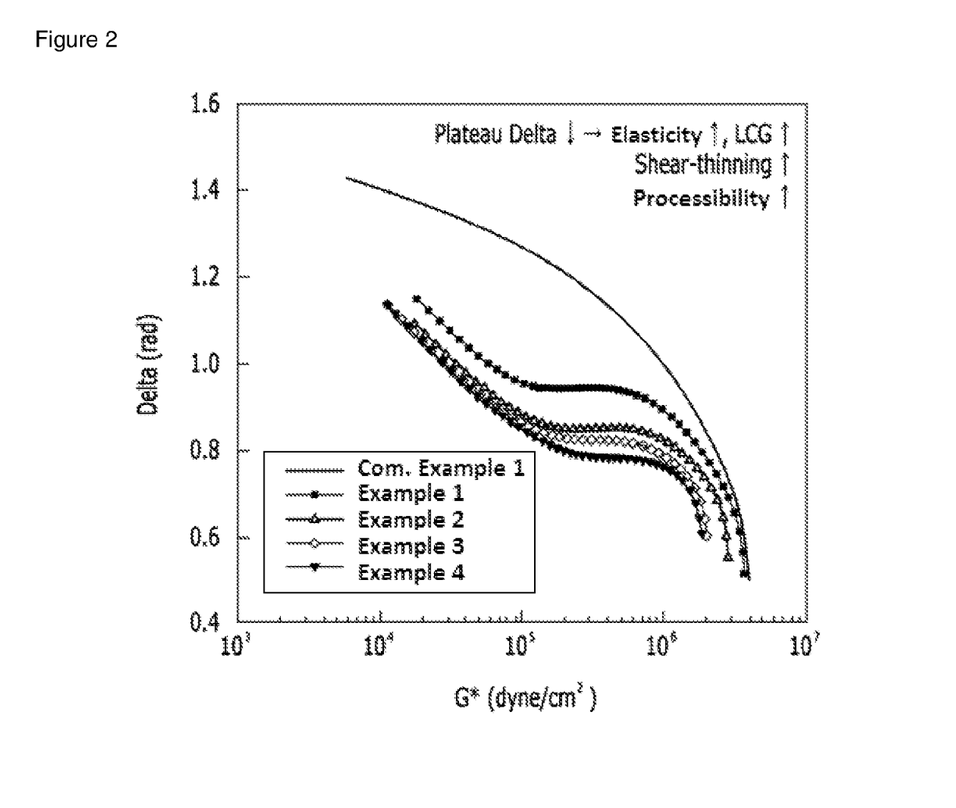
FIG. 2 shows a Van Gurp-Palmen plot at different frequencies in accordance with a comparative example and an example of the present invention.
Figure 3:
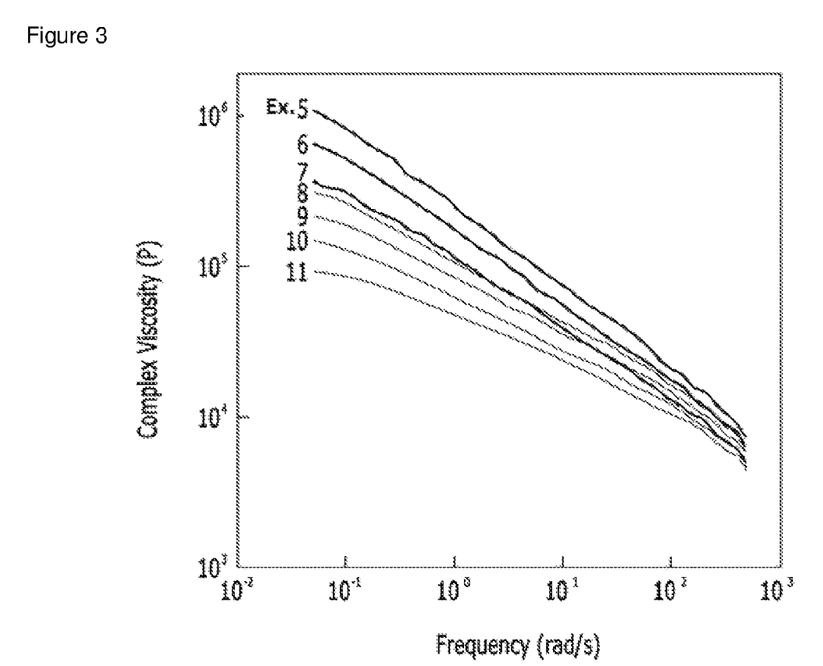
FIG. 3 shows a graph of the complex viscosity versus frequency in accordance with an example of the present invention.
Figure 4:
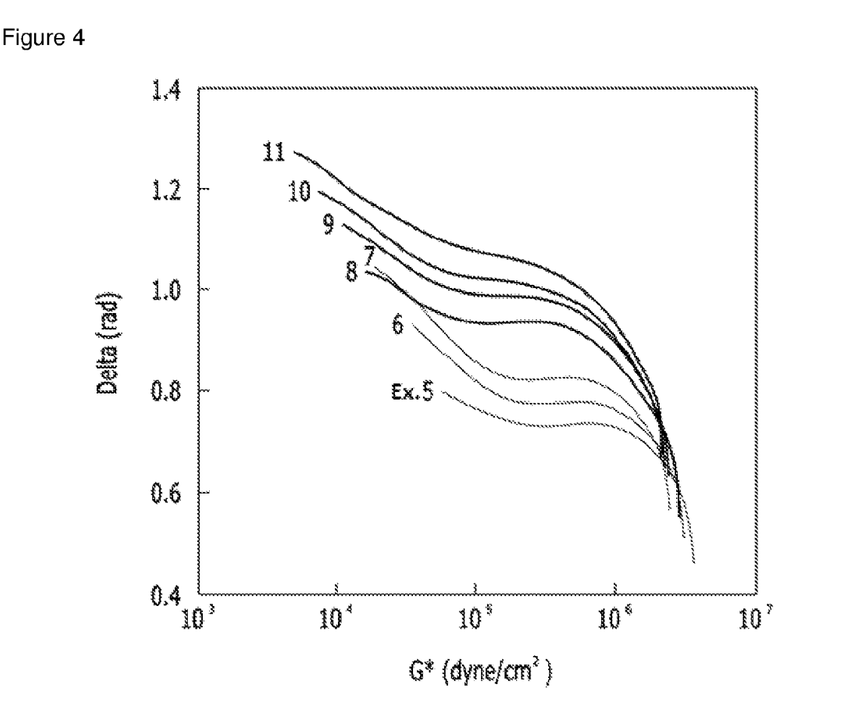
FIG. 4 shows a Van Gurp-Palmen plot at different frequencies in accordance with an example of the present invention.
Figure 5:
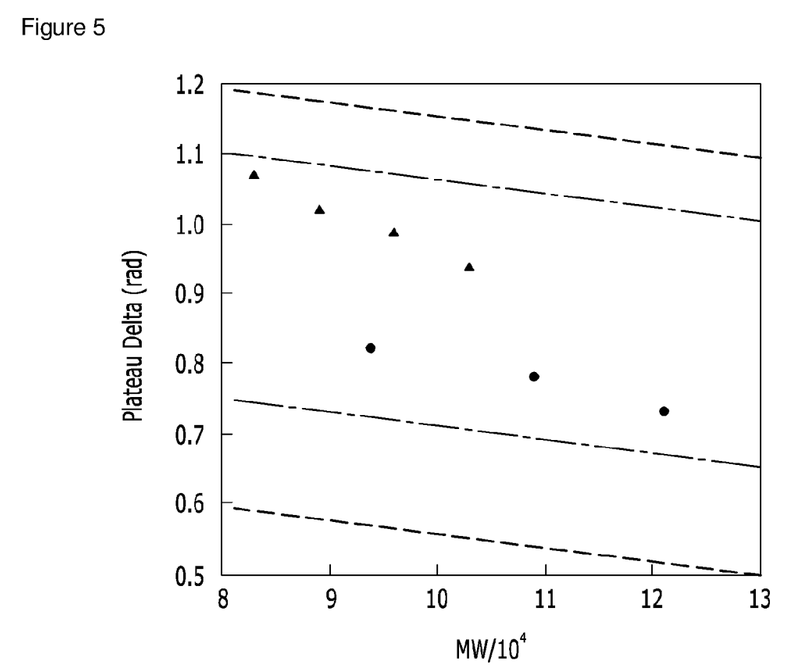
FIG. 5 illustrate a relationship between the plateau delta value and the molecular weight in accordance with an example of the present invention.

Hereinafter, preferred Examples are provided for better understanding. However, these Examples are for illustrative purposes only and the invention are not intended to be limited by these Examples.

Preparation Example 1

Preparation of the First Catalyst

Step 1) Preparation of a Ligand Compound 1.66 g (10 mmol) of fluorene was injected into a dried 250 mL Schlenk flask (first flask) and made in a state of argon to which 50 mL of ether was added under reduced pressure. After the mixture was cooled down to 0° C., the inside of the flask was replaced by argon to which 4.8 mL (12 mmol) of 2.5 M n-BuLi hexane solution was slowly added dropwise. After gradually raised to room temperature, the reaction mixture was stirred for one day. 40 mL of hexane was injected into another 250 mL Schlenk flask, to which 2.713 g (10 mmol) of (6-tert-butoxyhexyl)dichloro(methyl)silane was added. After cooled down to −78° C., the mixture prepared above was slowly added dropwise thereto. After gradually raised up to room temperature, the mixture was stirred for 12 hours.

2.02 g (10 mmol) of ((1H-inden-3-yl)methyl)trimethylsilane was injected into the other dried 250 mL Schlenk flask (second flask) to which 50 mL of THF was added and dissolved. The solution was cooled down to 0° C., 4.8 mL (12 mmol) of 2.5M n-BuLi hexane solution was added dropwise, warmed up to room temperature, and then stirred for 12 hours.

The mixture of the first flask was cooled down to −78° C., to which a solution of the second flask was added dropwise and then gradually warmed up to room temperature, and the mixture was stirred for 24 hours. 50 mL of water was added thereto and the organic layer was extracted three times with ether (50 mL×3). To the collected organic layer, an appropriate amount of $MgSO_4$ was added, stirred for a while, filtered and the solvent was dried under reduced pressure. As a result, 5.8 g (molecular weight: 566.96, 10.3 mmol, yield: 103%) of the ligand compound in the form of a yellow oil was obtained. The obtained ligand compound was used in the preparation of metallocene compounds without further separation procedure.

$^1$H NMR (500 MHz, $CDCl_3$): 0.00, 0.26 (3H, d), 0.46 (9H, m), 0.67 (1H, m), 0.83 (1H, m), 1.01 (1H, m), 1.25 (2H, m), 1.42 (2H, m), 1.49 (2H, m), 1.60 (9H, m), 1.72 (2H, m), 2.41 (2H, m), 3.66 (2H, m), 3.70, 3.77 (1H, s), 4.52 (1H, m), 6.01, 6.26, 6.37 (1H, s), 7.50 (1H, m), 7.59-7.80 (7H, m), 7.81 (1H, q), 7.97 (1H, d), 8.29 (2H, m).

2) Preparation of a Metallocene Compound

The ligand compound synthesized in Step 1 was added to a 250 mL Schlenk flask dried in an oven, and then dissolved in 4 equivalent weights of methyl tert-butyl ether (MTBE) and 60 mL of toluene to which 2 equivalent weights of n-BuLi hexane solution was added. After a lapse of one day, all solvent in the inside of the flask was removed under a vacuum condition, and then dissolved in an equal amount of toluene. One equivalent weight of $ZrCl_4(THF)_2$ was taken in a glove box and injected into a 250 mL Schlenk flask to which toluene was added to prepare a suspension. The above two flasks all were cooled dwon to −78° C., and then the lithiated ligand compound was slowly added to a toluene suspension of $ZrCl_4(THF)_2$. After completion of the injection, the reaction mixture was slowly warmed up to room temperature, stirred for one day and subjected to reaction. Then, toluene in the mixture was removed to a volume of about ⅕ through vacuum-reduced pressure. Hexane of about 5 times volume of the remaining toluene was added thereto and recrystallized. The mixture was filtered without contacting with the outside air to give a metallocene compound. In the upper portion of the filter the resulting filter cake was washed using a little hexane, and then weighed in glove box to identify the synthesis, yield and purity. As a result, 4.05 g (5.56 mmol, 55.6%) of an orange solid was obtained (purity: 100%, molecular weight: 727.08).

$^1$H NMR (500 MHz, $CDCl_3$): −0.13 (9H, m), −0.13 (3H, m), 0.53 (2H, m), 0.87 (2H, m), 1.25 (9H, m), 1.29 (4H, m), 1.51 (2H, s), 1.64 (2H, m), 3.34 (2H, m), 5.26 (1H, s), 6.81 (1H, m), 7.07 (2H, m), 7.18 (1H, m), 7.38 (1H, m), 7.46-7.56 (4H, m), 7.72 (1H, q), 7.95 (1H, d), 8.03 (1H, d)

Preparation Example 2

Preparation of a Second Catalyst

Step 1) Preparation of a Ligand Compound 2.323 g (20 mmol) of was added to a dried 250 mL Schlenk flask to which 40 ml of MTBE was injected under an argon gas atmosphere. After the solution as cooled down to 0° C., 8 mL (20 mmol) of 2.5M n-BuLi hexane solution was slowly added dropwise thereto. After gradually raised to room temperature, the reaction mixture was stirred for 24 hours. To another 250 mL Schlenk flask, 2.713 g (10 mmol) of (6-tert-butoxyhexyl)dichloro(methyl)silane and 30 mL of hexane were added, cooled down to −78° C. to which the mixture prepared above was added dropwise. The mixture was gradually warmed up to room temperature and stirred for 24 hours. 50 mL of water was added thereto and quenched, and the organic layer was separated and dried with $MgSO_4$. As a result, 3.882 g (9.013 mmol, 90%) of the product was obtained.

NMR standard purity (wt %)=100%, Mw=430.70

$^1$H NMR (500 MHz, $CDCl_3$): −0.45, −0.22, −0.07, 0.54 (total 3H, s), 0.87 (1H, m), 1.13 (9H, m), 1.16-1.46 (10H, m), 3.25 (2H, m), 3.57 (1H, m), 6.75, 6.85, 6.90, 7.11, 7.12, 7.19 (total 4H, m), 7.22-7.45 (4H, m), 7.48-7.51 (4H, m)

Step 2) Preparation of a Metallocene Compound

The ligand compound synthesized in Step 1 was injected into a 250 mL Schlenk flask dried in an oven, and then dissolved in 4 equivalent weights of methyl tert-butyl ether (MTBE) and 60 mL of toluene. 2.1 equivalent weights of n-BuLi hexane solution was added thereto, subjected to lithiation for 24 hours and then all solvent was removed through a vacuum-reduced pressure. Under a hexane solvent, the reaction product was filtered with Schlenk filter to obtain only Li-salt (3.092 g, 6.987 mmol). In order to obtain a more pure catalyst precursor, purification was carried out. 2.1 equivalent weights of $ZrCl_4(THF)_2$ was taken in a glove box and injected into a 250 mL Schlenk flask to which toluene was added to prepare a suspension. The above two flasks all were cooled down to −78° C., and then the lithiated ligand compound was slowly added to a toluene suspension of $ZrCl_4(THF)_2$. The reaction mixture was gradually warmed up to room temperature and stirred for one day. Then, toluene in the mixture was removed through vacuum-reduced pressure. Hexane of volume equivalent to the previous solvent was added thereto and recrystallized. Hexane slurry prepared was filtered under argon, and both the filtered solid and the filtrate were subjected to vacuum-reduced pressure to evaporate a solvent. The remaining filter cake and filtrate were identified through NMR, respectively, and then weighed in a glove box to identify the yield and purity. From 3.1 g (6.987 mmol) of the ligand compound, 1.321 g (2.806 mmol, 40.2%) of yellow oil was obtained and stored in a toluene solution (0.3371 mmol/mg).

NMR standard purity (wt %)=100%, Mw: 605.85

$^1$H NMR (500 MHz, $CDCl_3$): 0.88 (3H, m), 1.15 (9H, m), 1.17-1.47 (10H, m), 1.53 (4H, d), 1.63 (3H, m), 1.81 (1H, m), 6.12 (2H, m), 7.15 (2H, m), 7.22-7.59 (8H, m)

Preparation Example 3

Preparation of a Supported Catalyst

Preparation Example 3-1

3.0 kg of toluene solution was added to a 20 L sus autoclave reactor to which 1,000 g of silica (SP952X produced by Grace Davison, calcination at 200° C.) was added, followed by stirring while raising the reactor temperature up to 40° C. After silica was sufficiently dispersed for 60 minutes, 6.0 kg of 10 wt % methyl aluminoxane (MAO)/toluene solution was added to the reactor. The reaction temperature was raised up to 60° C. and the mixture was stirred at 200 rpm for 12 hours. The reactor temperature was again lowered to 40° C. and the stirring was stopped. Settling was then carried out for 30 minutes and the reaction solution was subjected to decantation. 3.0 kg of toluene was added to the reactor and stirred for 10 minutes. After stopping the stirring, settling was made for 30 minutes and the toluene solution was subjected to decantation.

2.0 kg of toluene was added to a separate reactor, and the compound (43 g) of Preparation Example 2 and 1,500 mL of toluene were put in the flask to prepare a solution. The solution was subjected to sonification for 30 minutes. The compound of Preparation Example 2/toluene solution thus obtained was added to the reactor and then stirred at 200 rpm for 90 minutes. The reactor temperature was lowered to room temperature and the stirring was stopped. Settling was then made for 30 minutes and the reaction solution was subjected to decantation.

2.0 kg of toluene was added to the reactor and stirred for 10 minutes. After stopping the stirring, settling was made for 30 minutes and the reaction solution was subjected to decantation.

3.0 kg of hexane was added to the reactor. The hexane slurry was transferred to the filter dry and the hexane solution was filtered. The filtrate was dried at 50° C. under reduced pressure for 4 hours to produce a 700 g-$SiO_2$-supported catalyst.

Preparation Examples 3-2 to 3-5

3.0 kg of toluene solution was added to a 20 L sus autoclave reactor to which 1,000 g of silica (SP952X produced by Grace Davison, calcination at 200° C.) was added, followed by stirring while raising the reactor temperature up to 40° C. After silica was sufficiently dispersed for 60 minutes, 6.0 kg of 10 wt % methyl aluminoxane (MAO)/toluene solution was added to the reactor. The reactor temperature was rasised up to 60° C. and the mixture was stirred at 200 rpm for 12 hours. The reactor temperature was again lowered to 40° C. and the stirring was stopped. Settling was then made for 30 minutes and the reaction solution was subjected to decantation. 3.0 kg of toluene was added to the reactor and stirred for 10 minutes. After stopping the stirring, settling was made for 30 minutes and the toluene solution was subjected to decantation.

2.0 kg of toluene was added to a separate reactor, and the compound of Preparation Example 1 and 1,000 mL of toluene were put in a flask to prepare a solution. The solution was subjected to sonification for 30 minutes. The compound of Preparation Example 1/toluene solution thus obtained was added to the reactor and then stirred at 200 rpm for 90 minutes. After stopping the stirring, settling was made for 30 minutes and the reaction solution was subjected to decantation. In this case, the amount of the compound of Preparation Example 1 was adjusted in the range of 20 g to 40 g to prepare Preparation Examples 3-2 to 3-5, respectively.

2.0 kg of toluene was added to a separate reactor, and the compound (20-40 g) of Preparation Example 2 and 1,500 mL of toluene were put in the flask to prepare a solution. The solution was subjected to sonification for 30 minutes. The compound of Preparation Example 2/toluene solution thus obtained was added to the reactor and then stirred at 200 rpm for 90 minutes. After lowering the reactor temperature to room temperature, the stirring was stopped, settling was made for 30 minutes and the reaction solution was then subjected to decantation.

2.0 kg of toluene was added to the reactor and stirred for 10 minutes. After stopping the stirring, settling was made for 30 minutes and the reaction solution was subjected to decantation.

3.0 kg of hexane was added to the reactor. The hexane slurry was transferred to the filter dry and the hexane solution was filted. The filtrate was dried at 500 under reduced pressure for 4 hours to produce a 700 g-$SiO_2$-supported catalyst.

Examples 1 to 4

Preparation of Olefinic Polymer

The supported catalysts prepared from Preparation Examples 3-1 to 3-4 were added to an isobutane slurry loop continuous polymerization reactor (reactor volume: 140 L, the reaction flow rate: 7 m/s) to produce an olefinic polymer. 1-Hexene was used as a comonomer and the reactor pressure was maintained at 40 bar and the polymerization temperature was maintained at 88° C. MI and density were adjusted by the amount of adding 1-hexene and hydrogen.

Examples 5 to 11

Preparation of Olefinic Polymer

The supported catalyst prepared from Preparation Examples 3-5 was added to an isobutane slurry loop continuous polymerization reactor (reactor volume: 140 L, reaction flow rate: 7 m/s) to produce an olefinic polymer. 1-Hexene was used as a comonomer and the reactor pressure was maintained at bar and the polymerization temperature was maintained at 88° C. MI and density were adjusted by the amount of adding 1-hexene and hydrogen.

Comparative Example

A commercial mLLDPE produced in a slurry loop polymerization process, i.e., LUCENE™ SP330 available from LG Chem, Ltd., was prepared.

The physical properties of the copolymers prepared in Examples and Comparative Example were measured as follows, and the results are shown in Tables 1 and 2 below.

1) Density: ASTM 1505
2) Melt index (MI, 2.16 kg/10 kg): measured at a temperature of 190° C., ASTM 1238
3) MFRR ($MFR_{10}/MFR_{2.16}$): the ratio where $MFR_{10}$ melt index (MI, load: 10 kg) is divided by $MFR_{2.16}$ (MI, load: 2.16 kg).
4) Molecular weight, molecular weight distribution: measured at a temperature of 160° C. The number average molecular weight and the weight average molecular weight were measured with PS standard using a gel permeation chromatography-FTIR (GPC-FTIR). The molecular weight distribution was indicated by the ratio of the weight average molecular weight and the number average molecular weight.
5) -($\eta$*gradient): the complex viscosity at different frequencies was calculated with a dynamic frequency sweep at 190° C. using ARES (advanced rheometric expansion system). The dynamic frequency sweep was measured by using a 25 mm parallel plate in the form of disk. The power law fitting was carried out by using a TA Orchestrator program which is a measurement program.
6) Plateau Delta: Van Gurp-Palmen graph can be obtained by selecting and plotting G* and delta of the variables resulting from the dynamic frequency sweep test.

The invention claimed is:

1. An ethylene-alpha olefin copolymer having:
a weight average molecular weight of 50,000 to 150,000,
a molecular weight distribution (Mw/Mn) of 2 to 5,
a density of 0.910 to 0.940 g/cm³,
MFRR ($MI_{10}/MI_{2.16}$) of 10 to 20, and
a $C_2$ value of −0.30 to −0.60 when a graph of complex viscosity ($\eta$*[Pa·s]) at the frequency ($\omega$ [rad/s]) of 0.05 to 500 rad/s is fitted to the following Equation 1:

$$y = c_1 x^{c_2}$$ [Equation 1]

and a plateau delta value in Van Gurp Palmen plot satisfies the following Equation 2:

$$-0.02 \times (Mw/10^4) + 0.76 \leq \text{plateau delta} \leq -0.02 \times (Mw/10^4) + 1.36.$$ [Equation 2]

2. The ethylene-alpha olefin copolymer according to claim 1,
wherein the $C_1$ is 30,000 to 300,000.

3. The ethylene-alpha olefin copolymer according to claim 1,
wherein the weight average molecular weight is 90,000 to 125,000.

4. The ethylene-alpha olefin copolymer according to claim 1,
wherein the molecular weight distribution is 2.5 to 3.5.

5. The ethylene-alpha olefin copolymer according to claim 1,
wherein the density is 0.915 to 0.930 g/cm³.

6. The ethylene-alpha olefin copolymer according to claim 1,
wherein the $C_2$ is −0.30 to −0.55.

7. The ethylene-alpha olefin copolymer according to claim 1,

TABLE 1

|  | Comparative Example 1 LG SP330 | Example 1 | Example 2 | Example 3 | Example 4 |
| --- | --- | --- | --- | --- | --- |
| Density | 0.929 | 0.927 | 0.927 | 0.927 | 0.927 |
| $MI_{2.16}$ | 0.70 | 0.41 | 0.50 | 0.67 | 0.72 |
| MFRR($MI_{10}/MI_{2.16}$) | 7.0 | 10.9 | 11.2 | 13.2 | 15.0 |
| Molecular weight(Mw, ×10⁴) | 13.1 | 10.2 | 10.2 | 9.6 | 9.9 |
| Molecular weight distribution(MWD) | 3.0 | 2.5 | 2.8 | 3.0 | 3.2 |
| -($\eta$* gradient: $C_2$) | 0.28 | 0.41 | 0.44 | 0.45 | 0.47 |
| $C_1$ | 77,400 | 133,000 | 116,000 | 82,900 | 87,300 |
| Plateau Delta(rad) | — | 0.94 | 0.85 | 0.82 | 0.78 |

TABLE 2

|  | Example 5 | Example 6 | Example 7 | Example 8 | Example 9 | Example 10 | Example 11 |
| --- | --- | --- | --- | --- | --- | --- | --- |
| Density | 0.927 | 0.927 | 0.927 | 0.920 | 0.920 | 0.920 | 0.920 |
| $MI_{2.16}$ | 0.16 | 0.23 | 0.51 | 0.55 | 1.10 | 1.36 | 1.83 |
| Molecular weight (Mw, ×10⁴) | 12.1 | 10.9 | 9.4 | 10.3 | 9.6 | 8.9 | 8.3 |
| Molecular weight distribution (MWD) | 30 | 2.9 | 2.9 | 2.9 | 2.8 | 2.8 | 2.7 |
| -($\eta$*gradient: $C_2$) | 0.54 | 0.51 | 0.47 | 0.42 | 0.39 | 0.37 | 0.33 |
| $C_1$ | 247,000 | 172,000 | 111,000 | 106,000 | 82,430 | 60,700 | 45,200 |
| Plateau Delta (rad) | 0.73 | 0.78 | 0.82 | 0.94 | 0.99 | 1.02 | 1.07 | wherein the plateau delta value satisfies the following Equation 2-1:

$$-0.02\times(Mw/10^4)+0.91\leq \text{plateau delta}\leq -0.02\times(Mw/10^4)+1.26. \quad \text{[Equation 2-1]}$$

8. The ethylene-alpha olefin copolymer according to claim 1, wherein the alpha olefin is one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

* * * * *